United States Patent [19]
Schmider et al.

[11] Patent Number: 5,652,825
[45] Date of Patent: Jul. 29, 1997

[54] POWER SUPPLY FOR LOW-VOLTAGE DC MOTOR

[75] Inventors: Fritz Schmider, Hornberg; Benno Doemen, St. Georgen, both of Germany

[73] Assignee: Papst-Motoren GmbH & Co. KG, St. Georgen, Germany

[21] Appl. No.: 326,275

[22] Filed: Oct. 20, 1994

[30] Foreign Application Priority Data

Oct. 25, 1993 [DE] Germany ............ 9316253 U

[51] Int. Cl.$^6$ .......................................... H02P 3/00
[52] U.S. Cl. ............... 388/822; 318/814; 363/89; 323/282; 323/351; 320/1; 320/32; 320/39
[58] Field of Search ............. 363/89, 84; 323/282, 323/351; 388/806, 815, 822; 320/1, 18, 20, 29, 32, 36, 39, 40, 41, 42, 57; 318/812, 814

[56] References Cited

U.S. PATENT DOCUMENTS

| | | | |
|---|---|---|---|
| 3,873,897 | 3/1975 | Müller | 318/138 |
| 4,321,523 | 3/1982 | Hammel | 320/14 |
| 4,392,091 | 7/1983 | Roberts et al. | 318/52 |
| 4,491,903 | 1/1985 | Montague | 363/48 |
| 4,768,142 | 8/1988 | Pasma | 363/89 |
| 4,806,844 | 2/1989 | Claydon et al. | 323/311 |
| 4,814,687 | 3/1989 | Walker et al. | 323/275 |
| 4,816,741 | 3/1989 | Ekstrand | 323/297 |
| 4,994,954 | 2/1991 | Katz et al. | 363/89 |
| 5,384,522 | 1/1995 | Toriyama et al. | 318/371 |
| 5,388,176 | 2/1995 | Dykstra et al. | 388/811 |
| 5,532,918 | 7/1996 | Mayrand et al. | 363/89 |

FOREIGN PATENT DOCUMENTS

| | | |
|---|---|---|
| 7037339 | 2/1972 | Germany . |
| 2311904 | 8/1974 | Germany . |
| 2251292 | 8/1974 | Germany . |
| 3145826 | 8/1982 | Germany . |
| 3843260 | 5/1990 | Germany . |
| 1032565 | 7/1983 | U.S.S.R. . |
| WO90-12445 | 10/1990 | WIPO . |

OTHER PUBLICATIONS

Harris Semiconductor, "HV-2405E World-Wide Single Chip Power Supply," Oct. 1992, Harris Corp., Melbourne, Florida.

Harris Semiconductor, "IGBTs (Insulated Gate Bipolar Transistors)" in *Discrete Power Selection Guide*, p. 2–1, publ. Feb. 1994 by Harris Corp., Melbourne, Florida.

*Primary Examiner*—Brian Sircus
*Attorney, Agent, or Firm*—Milton Oliver

[57] ABSTRACT

An improved power supply for converting any of various standard national AC network voltages to low-voltage DC power suitable for driving a 1 or 2-watt device, such as a fan, features a semiconductor control circuit (18, FET 46) which chops each half-wave of a rectified voltage and uses the low-voltage portions to feed charging current pulses to a storage capacitor. The voltage on the capacitor (14) is used by other portions of the circuit to regulate rotation speed of the fan or other consuming device (40) to a value set on a variable resistor. The use of the low-voltage portions of the input signal reduces power losses and increases efficiency.

22 Claims, 6 Drawing Sheets

POWER SUPPLY FOR LOW-VOLTAGE DC MOTOR

FIELD OF THE INVENTION

The present invention relates generally to a power supply, and, more particularly, to a power supply for a low-voltage direct current motor.

BACKGROUND

Such motors are used for a variety of purposes and have great advantages because, among other things, their rotation speed or RPM is controllable. It is desirable for power supplies for such motors, and for similar consuming devices with low wattage, to be adaptable for use in different nations with differing power network voltages and frequencies, for example from 70 to 260 volts and for 40 to 100 cycles per second (Hertz). Naturally, for many nations, one must also swap in a different plug configuration. Such highly adaptable power supplies have hitherto been expensive.

Adaptable power supplies are common in computers today, i.e. the so-called "international version" of a computer can be plugged into any power network having AC voltage between 110 and 260 V. The higher voltages cause some difficulty. Computers are devices with a power demand from about 30 to 100 watts, while small motors often have a power demand of 1 or 2 watts, so that many of the solutions known for computers would be too expensive.

SUMMARY OF THE INVENTION

Accordingly, it is an object of the present invention to provide an improved power supply for connecting a low-wattage device to a power network.

Briefly, this is accomplished by converting an AC voltage or a pulsing DC voltage (hereinafter called a "fluctuating" voltage) into a lower DC voltage. A DC circuit includes a storage capacitor. The capacitor is charged from the fluctuating voltage by a controllable switching element controlled either by the capacitor voltage or by an output signal of the consuming device. The switching element blocks the charging current in those intervals of the fluctuating voltage when its instantaneous value exceeds a predetermined limit value. One thus blocks the controllable element only when the fluctuating voltage (usually a pulsing DC voltage) becomes too high, or, stated positively, one completes the circuit whenever the fluctuating voltage is below a limit voltage. During each half-sine-wave, the switch can be turned on—as needed—once at the start of the half-wave while the voltage is still low, and once at the end of the half-wave, when the voltage is low enough again. In between, the switch blocks, in the region of high amplitudes of the half-wave.

The charging current for the storage capacitor in the DC circuit is thus fed in the form of short pulses. For example, using 50 Hz AC supply, the capacitor is fed 200 short pulses per second—like needle pulses—which each have a duration of 350 to 1000 microseconds, this duration depending upon the current demand of the consuming device and falling in the range between 1.5% and 5% of a cycle duration. These pulses are thus necessarily high-current pulses, i.e. if the DC current at the output is about 50 mA, the pulses have values of about 1 ampere.

It is advantageous to implement the controllable element as an electronic switch, particularly as a Field Effect Transistor (FET). Such FET's can briefly carry high currents and are thus well adapted for this application.

Preferably, the source-gate voltage of the FET is limited, to limit the current through the FET to safe values. Especially if the storage capacitor is fully discharged during turn-on of the power supply, and thus behaves in the first instant like a short-circuit, a "soft loading" or "soft start" of the capacitor is performed to prevent overloading of the FET. In such an arrangement, it is not absolutely necessary to provide a resistor in series with the controllable element for limitation of the current, since the current limitation can be handled otherwise.

To the extent a resistor is used, preferably this is a Positive Temperature Coefficient (PTC) resistor, since in case of short circuit, it acts like a fuse: its resistance rises so steeply during overload that the current through it is limited to safe values.

According to another advantageous feature, a DC motor can be connected to the power supply. An RPM-dependent voltage signal from the motor can be used, during the interval the controllable circuit is not blocked, to regulate the motor to keep motor RPM at a constant value. This RPM-dependent signal can be generated in a tacho-generator or taken directly from the motor, e.g. using a Hall rotor-position sensor. The power supply can be used—practically without additional cost—to control the RPM of the motor. The RPM can be set at the motor itself. This is of great value in many applications.

Further, experience has shown that, given proper arrangement, power losses are low, so that excessive heating is avoided.

Further details and advantageous refinements of the invention are set forth in the following description and depicted in the accompanying figures. However, these are exemplary only and not intended to limit the scope of the invention.

DETAILED DESCRIPTION

Figure 1:
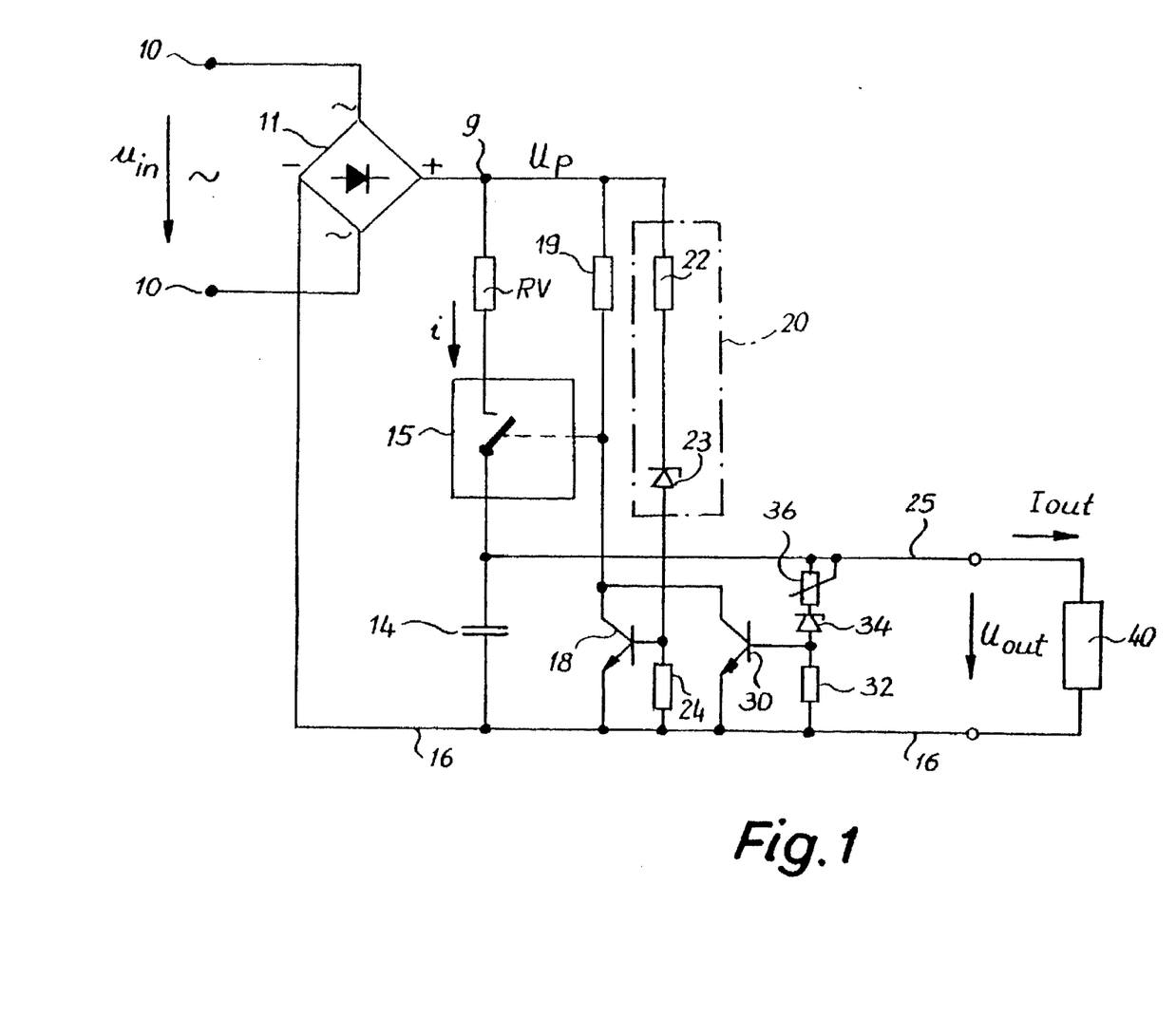
FIG. 1 is a schematic diagram of the circuit of the present invention.

FIG. 1 illustrates the basic principle of the present invention. The inputs of a full-wave rectifier 11 are connected to an AC power network 10. The rectifier's positive output 9 furnishes a pulsing direct current $U_p$ which is shown on line (a) of FIG. 2. The input voltage $U_{in}$ can be, e.g., 70 to 260 volts AC (effective value, RMS) and the input frequency can be, e.g., 40 to 100 Hz.

The voltage $U_p$ serves to charge up a storage capacitor 14, specifically after passing through a pre-resistor $R_v$ and a controllable switch 15. In practice, the latter is preferably an electronic switch which can briefly conduct high currents, such as a Field Effect Transistor (FET), a bipolar Darlington transistor, an Insulated Gate Bipolar Transistor (IGBT), a Gate Turn-Off (GTO) Thyristor, or the like.

The operating principle of the power supply is to block this switch 15 whenever the amplitude of the pulsating voltage $U_p$ is higher than a predetermined limit value $U_{lim}$. This creates, in each half-wave, two regions $T_L$ (graph c of FIG. 2) during which a current i can flow from output 9 via switch 15 and capacitor 14 to a negative conductor 16 which is connected to the negative output of rectifier 11. A first one of these regions $T_L$ is in the region of rising voltage $U_p$. Thereafter follows a blocked region $T_n$ (graph c of FIG. 2), and after this follows a second region $T_L$ in the region of falling voltage $U_p$, as clearly shown in FIG. 2.

Immediately after turn-on of the power supply, current i can flow for a longer time period $T_{L1}$, since capacitor 14 isn't yet charged. Once it is charged, current i can only flow, whenever the instantaneous value of voltage $U_p$ is greater than the voltage on capacitor 14, designated as $U_{out}$ in FIG. 2, graphs (a) and (b).

Given a (typical European) alternating current of 50 Hz, time periods $T_L$ last a few hundred microseconds, their length depending upon the instantaneous current demand of the connected consuming device.

Figure 3:
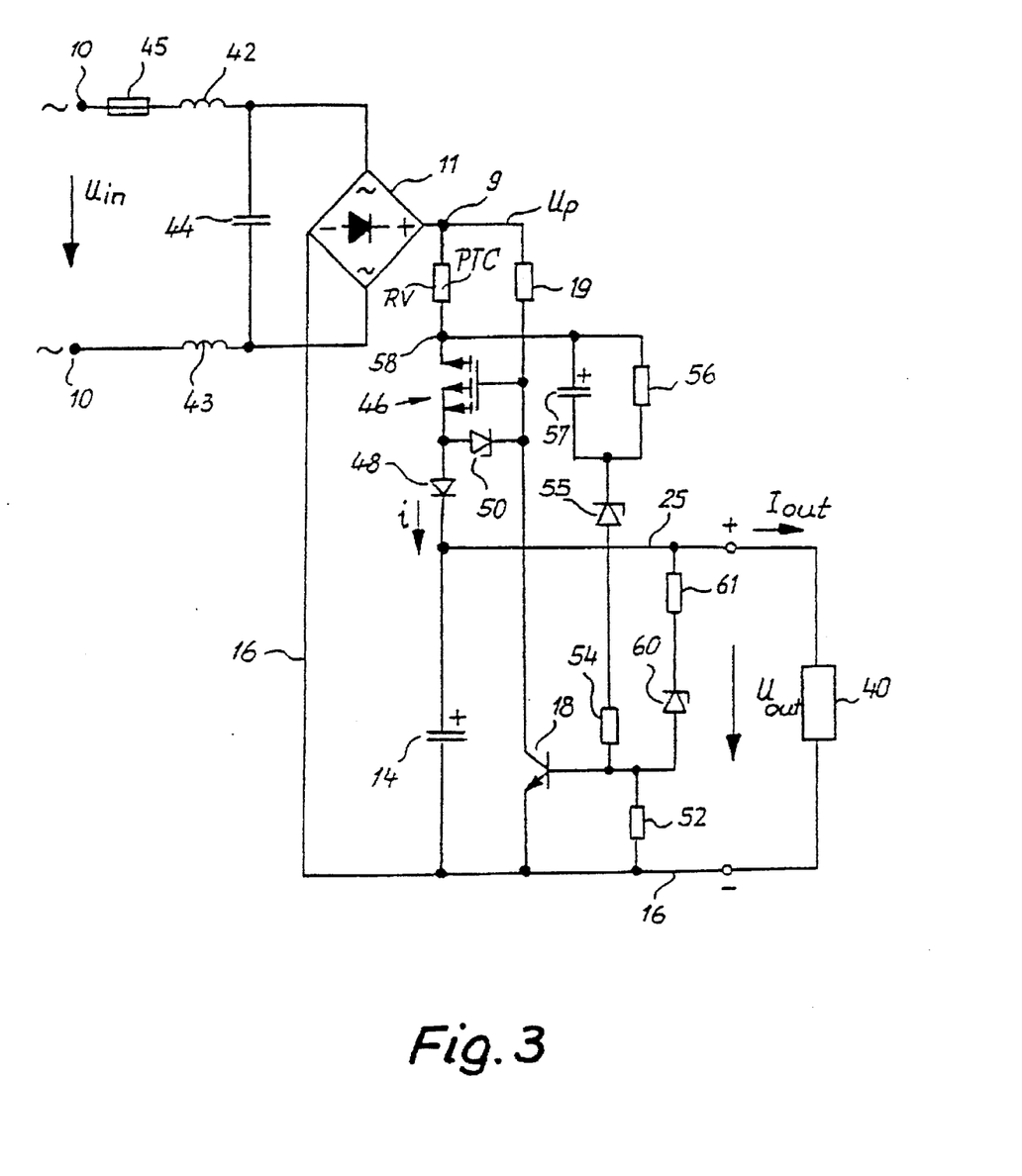
FIG. 3 is a circuit diagram of a first embodiment of the invention.

In the context of the invention, it is desirable if, during climbing voltage $U_p$, the limit voltage $U_{lim}$ is smaller than during falling voltage $U_p$ (FIG. 6), and FIG. 3 shows how this can be achieved in a very advantageous manner.

During the high-amplitude values of $U_p$, the controllable switch 15 is blocked by an NPN control transistor 18. Its collector is connected via a resistor 19 to terminal or junction 9, and its emitter is connected to terminal 16. The voltage on its collector so controls switch 15 that the latter is open, whenever transistor 18 is conductive, and closed, whenever transistor 18 is blocked.

Control of transistor 18 is provided by a circuit 20 between terminal 9 and the base of transistor 18. Circuit 20 comprises a series-connected resistor 22 and Zener diode 23. Further, the base of transistor 18 is connected through a resistor 24 to terminal 16.

OPERATION OF THE FIG. 1 EMBODIMENT

As the voltage $U_p$ climbs, at a specified value $U_{lim}$ transistor 18 conducts and renders switch 15 non-conductive, i.e. open. Conversely, when voltage $U_p$ falls, below a specified limit value transistor 18 becomes non-conductive, since it no longer receives base current through Zener diode 23, and switch 15 becomes conductive, i.e. switched on.

In this manner, the region $T_n$ (graph c of FIG. 2) of voltage $U_p$ is shielded or masked, i.e. during $T_n$ the switch 15 is always forced open.

Regulation of the voltage on capacitor 14, i.e. between terminal 16 and a positive conductor 25, is provided in FIG. 1 by a second NPN transistor 30, whose emitter-collector path is connected in parallel to that of transistor 18. Its base is connected with terminal 16 through a resistor 32 and with positive conductor 25 through a series-connected Zener diode 34 and variable resistor or potentiometer 36.

If the voltage on line 25 goes too low because capacitor 14 is too strongly discharged, Zener diode 34 blocks, and so does transistor 30, so that switch 15 can be turned on, whenever voltage $U_p$ is smaller than voltage $U_{lim}$.

If the voltage on line 25 goes too high because capacitor 14 is too highly charged, Zener diode 34 and transistor 30 conduct, and make switch 15 non-conductive. Transistors 18 and 30 thus work together, i.e. only when both are blocked, can switch 15 become conductive and charge up capacitor 14. Therefore, within the conductive intervals $T_L$, there is an additional ON-OFF regulation: whenever the voltage on capacitor 14 goes too high, interval $T_L$ is compensatingly shortened. In this manner, the voltage on capacitor 14 is kept to a desired value, which can be adjusted on potentiometer 36.

Between the positive and negative outputs 25 and 16, a DC voltage of, for example, 24 V. or 48 V. is available, and it serves to supply a consuming device 40, e.g. a small motor.

The great advantages are that such a consuming device can be connected practically in any country, through the power supply of the present invention, to the AC power network available there, regardless of its voltage or AC frequency, and that the power loss in the input resistor RV is small.

Figure 2A:
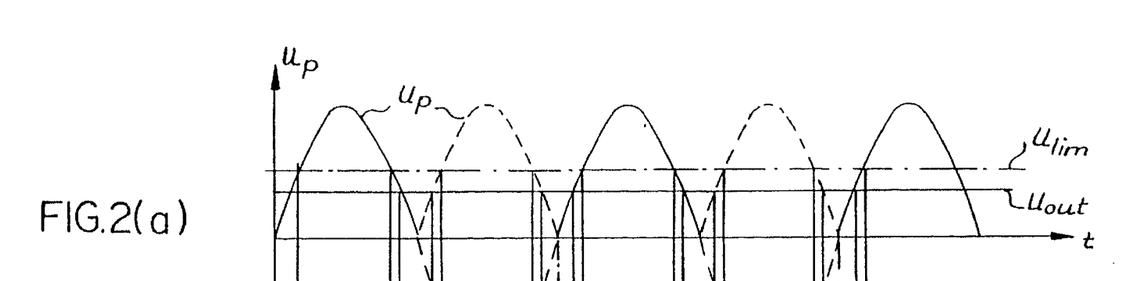
FIG. 2 is a set of three graphs, to a common time scale, illustrating the operating principle of the present invention.
Figure 2B:
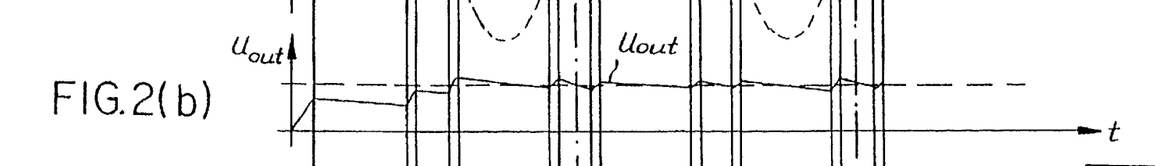
Figure 2C:
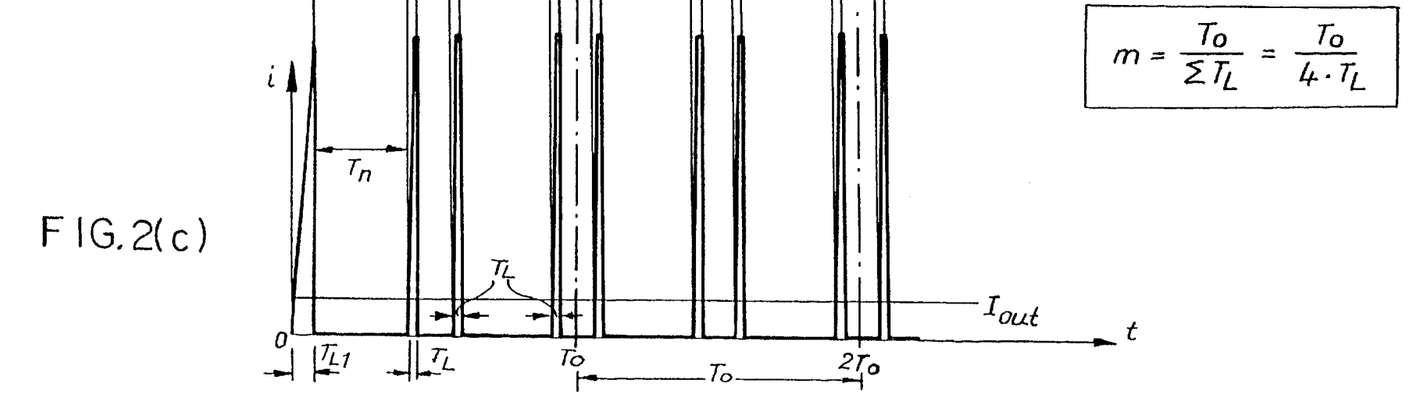

This has the following reason: the level of lost power at resistor Rv depends upon the amplitude of current i, upon the size of resistance Rv, and upon the duty ratio m which is defined by the equation shown in FIG. 2. The lost power can be calculated using the following formula:

$$Pv = i^2 \times RV \times m \tag{1}$$

Since m has an approximate value of 20, overall a low power loss results. This is a consequence of the fact that, during a phase interval or cycle $T_o$ of the network alternating voltage (at 50 Hz, a phase interval lasts 20 milliseconds, i.e. 1000 ms/50), capacitor 14 is fed four brief current pulses i, which means that all low-voltage regions of both sinusoidal half-waves are used for charging capacitor 14. Thus, instead of fewer current pulses of higher amplitude, the present invention uses many current pulses of low amplitude, and since the square of the amplitude is a factor in the power loss, the invention results in low losses.

FIG. 3 illustrates a preferred embodiment of the invention. Equivalent, or functionally equivalent, components to those shown in FIG. 1 are designated with the same reference numerals in FIG. 3 and are usually not described again.

Rectifier 11 is connected via noise suppression components to the AC network 10, namely via a respective coil 42, 43 on each rectifier input. Also provided are a fuse 45 in series with one of the coils and a noise suppressing capacitor 44 bridging the two inputs; these components serve mainly to hinder transmission of pulses from the power supply into the AC power network.

In this embodiment, switch 15 is a MOSFET transistor 46 which can briefly conduct high currents. MOSFET is an acronym for Metal Oxide Semiconductor Field Effect Transistor; a preferred model is type IRF 422, but other types can be used, depending upon the wattage of the power supply. The MOSFET's drain terminal is connected to a resistor Rv; its source terminal is connected via a diode 48 to a capacitor 14, e.g. 100 microfarad; and its gate is connected to the collector of an NPN transistor 18, e.g. model BC847. Between gate and source, there is a Zener diode 50 as show, which protects the gate during switching operations and, when suitably dimensioned, causes FET 46 to operate as a constant current source which, upon switch-on of the power supply, limits the charging current of storage capacitor 14 to a value which FET 46 can tolerate. Thus, resistor Rv can be made small or perhaps be omitted entirely. In practice, however, it is advantageous to use a Positive Temperature Coefficient (PTC) resistor as Rv, since this represents an economical and effective short-circuit protection, supplemental to fuse 45.

If transistor 18 in FIG. 3 blocks, i.e. becomes nonconductive, FET 46 receives from junction 9, via resistor 19, a corresponding signal and becomes conductive.

Conversely, when transistor 18 conducts, FET 46 blocks or becomes nonconductive. In this situation, diode 48, which is preferably type 1N4002, prevents capacitor 14 from discharging through FET 46 or through Zener diode 50 and transistor 18, thereby destroying those components.

The base of transistor 18 is connected via a resistor 52 to conductor 16. In order to block FET 46 during the high-amplitude values of pulsating voltage $U_p$, the base of transistor 18 is connected to a terminal 58, namely the drain of FET 46, serially via a resistor 54, a Zener diode 55 and a parallel circuit of a resistor 56 and a capacitor 57.

This produces a coupling in the manner of a Schmitt trigger and a certain switching hysteresis: if FET 46 becomes conductive, the potential at junction 58 declines, and therefore reduces the potential on the base of transistor 18, so that it becomes even more strongly blocked. Conversely, if FET 46 becomes blocked, the potential at point 58 rises and makes transistor 18 more strongly conductive, so that FET 46 blocks even faster. This reduces the power loss in the FET, makes the switching process certain, and avoids oscillations.

Analogously to the circuit 20 of FIG. 1, components 54, 55, 56 and 57 operate to make transistor 18 conductive whenever the instantaneous value of pulsating voltage $U_p$ becomes greater than $U_{lim}$, which in this case causes FET 46 to become blocked.

Figure 6:
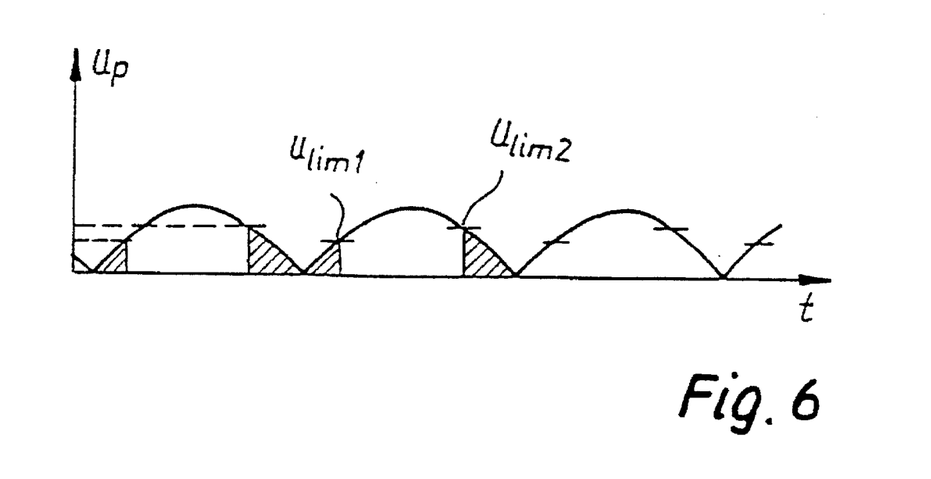
FIG. 6 is a diagram which explains differing limit voltages.

However, capacitor 57 causes a very desirable difference between limit voltage $U_{lim1}$ during rising voltage $U_p$, and limit voltage $U_{lim2}$ during falling voltage $U_p$ as shown in FIG. 6, i.e. when $U_p$ is declining, $U_{lim}$ is higher than it is when $U_p$ is rising.

During rising $U_p$, capacitor 57 has partially discharged via resistor 56 and therefore has only a low voltage. This causes a low $U_{lim1}$. Subsequently, it charges up due to the high amplitude values of $U_p$, so that its storage voltage is added to the voltage of Zener diode 55 and the limit value $U_{lim2}$ becomes higher. This has the result that the current pulses i into capacitor 14 are approximately the same size at either rising or declining $U_p$. This improves the efficiency of the power supply since, as previously explained, the efficiency is the best, whenever all current pulses i have about the same amplitude and duration.

One must take care that capacitor 57 is not connected in parallel to both resistances 54 and 56, but rather only to resistor 56. This prevents transistor 18 from being destroyed upon switch-on of the power supply.

The base of transistor 18 is further connected through a series circuit of a Zener diode 60 and a resistor 61 to conductor 25. If the voltage on capacitor 14 becomes too high, Zener diode 60 conducts, and with it so does transistor 18, so that FET 46 is blocked. Conversely, if the voltage on capacitor 14 is too low, Zener diode 60 blocks and transistor 18 is thenceforth only controlled by voltage $U_p$ from junction point 58.

Figure 4:
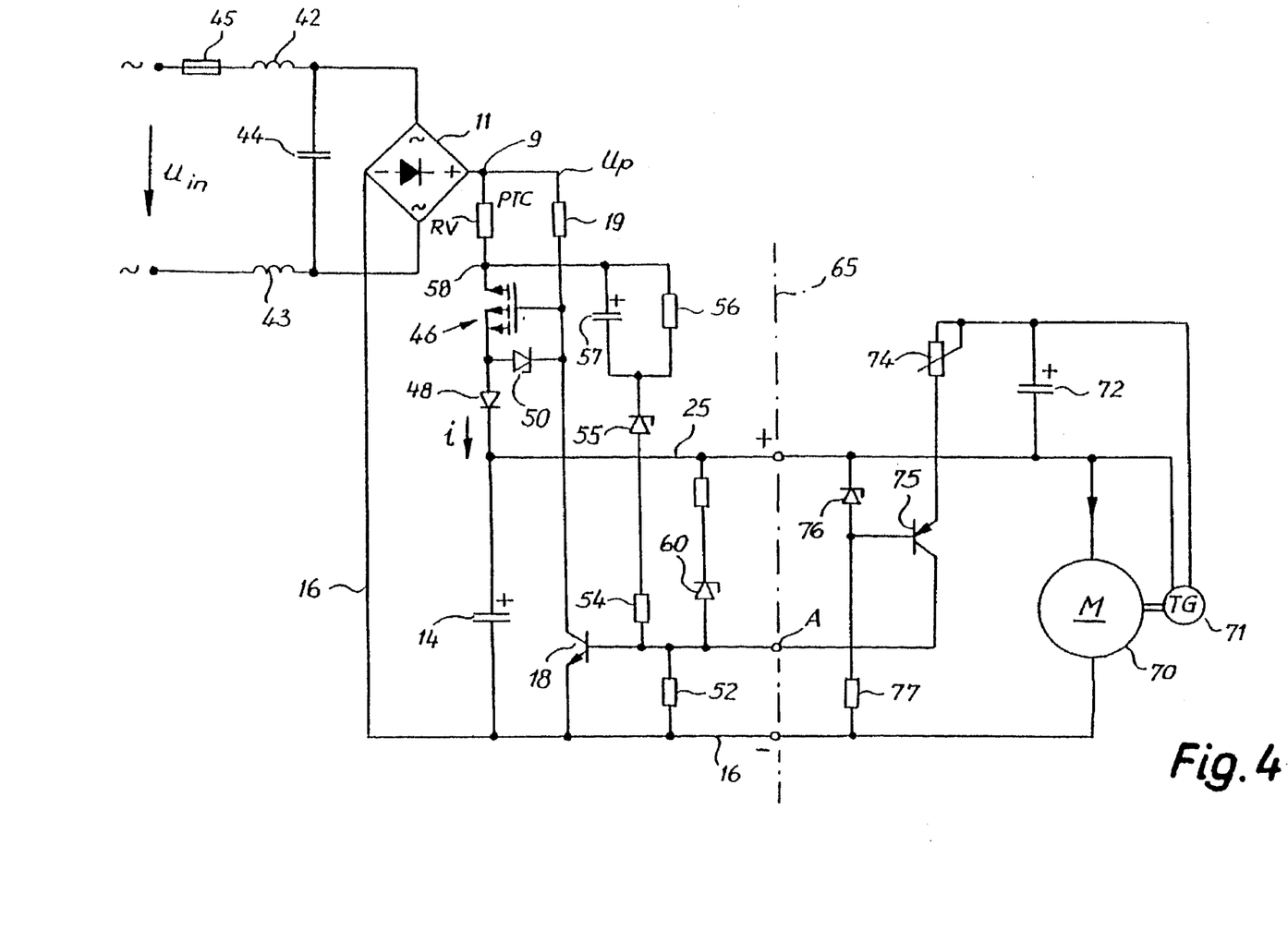
FIG. 4 is a circuit diagram analogous to FIG. 3, designed specifically for speed regulation of a DC motor.

FIG. 4 illustrates another embodiment of the invention, in which the portion of the circuit left of dash-dotted line 65 is the same as that of FIG. 3, except that the base of transistor 18 has an additional connection to a terminal A.

In FIG. 4, the device serves for supply of power to a small direct current motor 70 which is coupled to a tachogenerator 71, which at its output provides a DC voltage which is smoothed by a capacitor 72. Its positive value is fed through a variable resistor 74 (for rotary speed setting) to the base of a PNP transistor 75, whose collector is connected to terminal A. A suitable transistor is type BC 856. Its base is connected through a Zener diode 76 to conductor 25 and through a resistor 77 to conductor 16.

If motor 70 runs too fast, the voltage on its generator 71 goes too high and transistor 75 becomes conductive, causing transistor 18 to receive a base current and become conductive. This blocks FET 46. When this reduces the RPM of motor 70, transistor 75 blocks again. Thus, in the already-described manner, the voltage $U_{out}$ shown in FIG. 2 is regulated to a constant value. In this manner, with the power supply of the present invention, one can control the rotation speed of motor 70 very simply.

Figure 5:
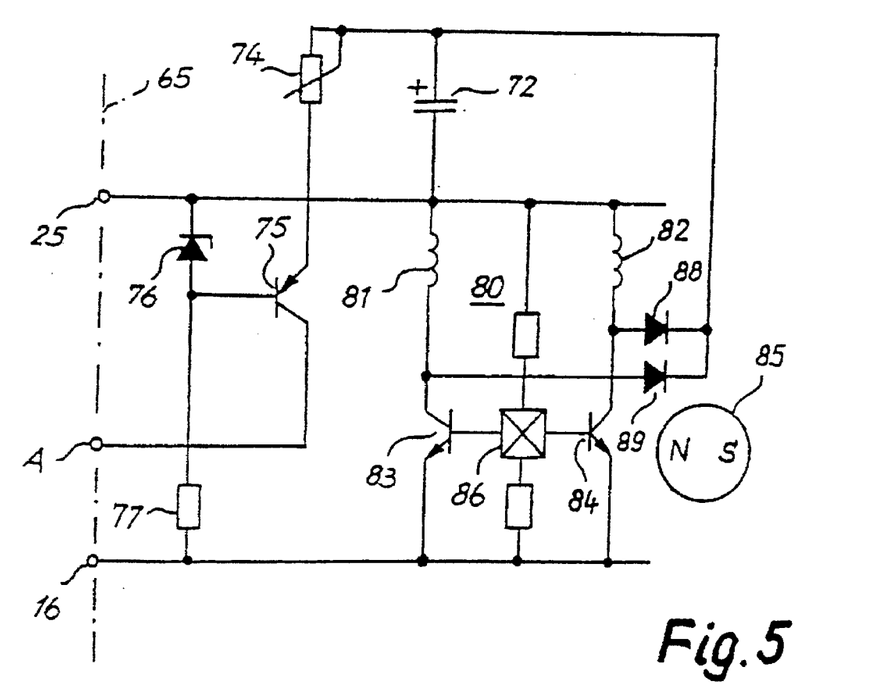
FIG. 5 shows a variation of FIG. 4, in which the motor is a collector-less DC motor.

FIG. 5 shows the same thing for a simple structure including a collectorless DC motor 80, as known from German patent DE 23 46 380 C3 or U.S. Pat. No. 3,873,897, Müller/Papst-Motoren. Naturally, this is only an example; every known kind of a collectorless DC motor can be operated with the power supply of the present invention.

Motor 80 is connected to the power supply just as the motor 70 of FIG. 4, so that the power supply is not illustrated again. Equivalent, or functionally equivalent, components to those of FIG. 4 are designated with the same reference numerals and are not described again.

Motor 80 has, in its stator, two winding strands 81, 82, each of which receives current through a respective NPN transistor 83, 84, for example of type BC847. The permanent-magnet rotor is designated 85. The transistors 83, 84 are controlled by a Hall generator 86 located in the magnetic field of rotor 85, whose position it senses. The Hall generator 86 thus serves as a rotor position sensor.

Strands 81, 82 carry current alternately: that is, when strand 81 is carrying current, because transistor 83 is conductive, strand 82 is current-less. However, rotor 85 induces in strand 82 an alternating voltage proportional to the rotation speed, and this is fed via a diode 88 to a capacitor 72. The same goes for strand 81 and its associated diode 89. Thus, at capacitor 72, one obtains a DC voltage which is proportional to the rotation speed of rotor 85. This is fed via the resistor 74 (for rotation speed setting) to the emitter of PNP transistor 75. The rest of the circuit corresponds to that of FIG. 4, as does the mode of operation, i.e. at excessive RPM transistor 75 and transistor 18 become conductive, thereby blocking FET 46 and making rotation speed decline as desired. Such motors 80 are particularly maintenance-free and have a long service life. Further, they have no spark-inducing collector, which can be advantageous, e.g. in a laboratory environment where flammable gases may be present.

In a similar manner, using terminal A one can control a temperature or another arbitrarily chosen process. Similarly, one could shut off the power supply by feeding sufficient current to input A.

Figure 7:
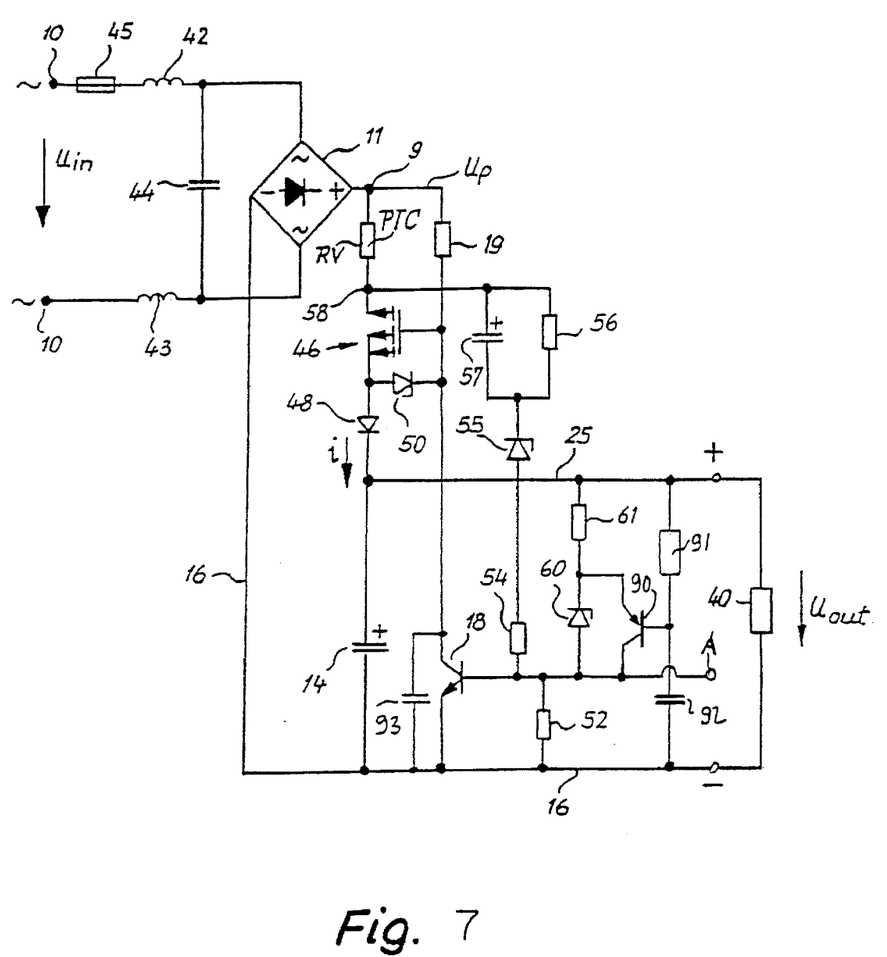
FIG. 7 is a circuit diagram of a preferred variant of FIG. 3.

FIG. 7 illustrates a variation of the FIG. 3 circuit. Equivalent, or functionally equivalent, components to those of the preceding figures are designated with the same reference numerals and are not described again.

Here, the emitter-collector path of a PNP transistor 90 is connected in parallel to Zener diode 60, so that the voltage on this Zener diode is reduced whenever transistor 90 becomes conductive. The base of transistor 90 is connected via a charging resistor 91 with the plus conductor 25 and via a capacitor 92 with the minus or negative conductor 16. As shown, a capacitor 93 is parallel-connected, to slow down the switching process at FET 46.

In FIG. 7, upon switch-on of the power supply, the capacitor 92 is discharged, so the base of transistor 90 has, at switch-on, roughly the potential of minus conductor 16, so that transistor 90 becomes full conductive as soon as the voltage on capacitor 14 has reached a specified minimum value. This makes transistor 18 conductive also, so that FET 46 blocks even at relatively low voltages. This keeps the inrush current from getting too large. After charge-up of the capacitor 92 (via charging resistor 91), transistor 90 blocks, and the circuit behaves as described above with reference to FIG. 3. The capacitor 93 makes the switching processes at FET 46 slower, to reduce, RF noise.

The additional components 90, 91, 92 provide, in addition to the above-described "soft start," an improved symmetry of current pulses through the FET 46 and a relatively wide loading range. This is important, for example with motors which are subjected to relatively great variations of load. In particular applications, the coils 42, 43 can be replaced by resistors.

The embodiment of FIG. 7 can be used advantageously with motors according to FIGS. 4 and 5, but is adapted for use with any desired consuming device 40.

The invention is capable of many variations, and within its framework, numerous modifications are possible. It is particularly advantageous to implement resistor Rv as a PTC (Positive Temperature Coefficient) resistor since—upon destruction of FET 46—the device becomes short-circuit-proof, since the warming of Rv increases its resistance steeply and thereby limits the current to safe values.

What is claimed is:

1. Power supply for a low-voltage power-consuming device (70; 80) which converts a fluctuating input voltage $U_p$ into a lower direct output voltage $U_{out}$, comprising a DC circuit (16, 25) including a storage capacitor (14);

means (15; 46) for feeding a charging current, derived from said fluctuating input voltage $U_p$, to said storage capacitor (14), said charging means being controlled by one of a voltage on said storage capacitor (14) and an output signal (71) from said consuming device (70; 80);

an input resistance (Rv), connected in series with said means (15; 46) for feeding a charging current, in order to limit current passing through said feeding means (15; 46); and means (46) for blocking charging current during time regions ($T_n$) of said fluctuating input voltage $U_p$ in which an instantaneous value of said fluctuating input voltage exceeds a predetermined voltage limit value ($U_{lim}$), wherein said fluctuating voltage is an alternating voltage and twice during each half-wave of said alternating voltage, said feeding means turns on while said alternating voltage a) rises from an initial value to a first limit value ($U_{lim1}$) and b) declines from a second limit value ($U_{lim2}$) to a base value.

2. Power supply according to claim 11, wherein said means (46) for blocking is a Field Effect Transistor (FET).

3. Power supply according to claim 2, further comprising means for limiting a source-gate potential on said FET, in order to limit current passing through said FET.

4. Power supply according to claim 3, wherein said limiting means comprises a Zener diode (30) connected parallel to a source-gate pathway of said FET (46).

5. Power supply according to claim 1, further comprising a coil (42, 43) and an ohmic resistance (Rv) connected at an input of said means (15, 46) for feeding a charging current.

6. Power supply according to claim 1, wherein said fluctuating input voltage is an output voltage from a full-wave rectifier (11) whose input is an alternating voltage.

7. The combination of a power supply according to claim 1 with a DC motor (70; 80), wherein operation of said motor generates a rotation-speed-dependent voltage signal and during time intervals in which said charging current is not blocked due to a too-high value of said fluctuating voltage $U_p$, said rotation-speed-dependent voltage signal regulates said charging current and thereby maintains said rotation speed substantially constant.

8. Power supply according to claim 1, further comprising an electronic control element (18) and coupling means (55, 56, 57) interconnecting said electronic control element and said feeding means (15, 46) to assure reliable ON-OFF switching of said feeding means.

9. Power supply according to claim 8, wherein said coupling means detect a voltage drop at an input resistor (Rv) of said feeding means and control said electronic control element in accordance with said voltage drop.

10. Power supply according to claim 1, wherein said first limit value ($U_{lim1}$) for shut-off of said means for feeding charging current during rising fluctuating voltage is lower than said second limit value ($U_{lim2}$) for turn-on of said means for feeding charging current (46) during falling fluctuating voltage.

11. Power supply for a low-voltage power-consuming device (70; 80) which converts a fluctuating input voltage $U_p$ into a lower direct output voltage $U_{out}$, comprising a DC circuit (16, 25) including a storage capacitor (14);

means (15; 46) for feeding a charging current, derived from said fluctuating input voltage $U_p$, to said storage capacitor (14), said charging means being controlled by one of a voltage on said storage capacitor (14) and an output signal (71) from said consuming device (70; 80); and a control circuit (18, 54, 56, 57) which responds to said fluctuating input voltage by twice enabling, during each rising and falling cycle of said fluctuating input voltage, charging of said storage capacitor, when said voltage (a) rises from a base value up to a first voltage limit ($U_{lim1}$) and (b) falls from a second voltage limit ($U_{lim2}$) back to said base value.

12. Power supply according to claim 11, wherein said controlled charging means comprises a Field Effect Transistor (46).

13. Power supply according to claim 12, further comprising means for limiting a source-gate voltage of said Field Effect Transistor (FET) (46) in order to limit current through said FET.

14. Power supply according to claim 13, wherein said means for limiting voltage is a Zener diode (30) connected parallel to a source-gate pathway of said FET (46).

15. Power supply according to claim 11, further comprising an input resistance (Rv) connected at an input of said means (15; 46) for feeding a charging current, in order to limit current (i) passing through said feeding means (15; 46).

16. Power supply according to claim 15, wherein said input resistance (Rv) at least partially comprises a Positive Temperature Coefficient (PTC) resistor.

17. Power supply according to claim 11, further comprising a coil (42, 43) and an ohmic resistance (Rv) connected at an input of said means (15, 46) for feeding a charging current.

18. Power supply according to claim 11, wherein said fluctuating input voltage is an output voltage from a full-wave rectifier (11) whose input is an alternating voltage.

19. The combination of a power supply according to claim 15 with a DC motor as said power-consuming device (70; 80), wherein operation of said motor generates a rotation-speed-dependent voltage signal and, during time intervals in which said charging current is not blocked, said rotation-speed-dependent voltage signal so regulates said charging current that rotation speed of said motor is maintained substantially constant.

20. Power supply according to claim 11, further comprising an electronic control element (18) and coupling means (55, 56, 57) interconnecting said electronic control element and said feeding means (15, 46) to assure reliable ON-OFF switching of said feeding means.

21. Power supply according to claim 20, further comprising an input resistance (Rv) connected at an input of said feeding means (46), and wherein a voltage drop across said input resistance (Rv) is measured and is applied to said electronic control element as a coupling signal.

22. Power supply according to claim 11, wherein said fluctuating voltage is an alternating voltage and twice during each half-wave of said alternating voltage, said feeding means turns on while said alternating voltage a) rises from an initial value to a first limit value ($U_{lim1}$) and b) declines from a second limit value ($U_{lim2}$) to a base value, and wherein said first limit value ($U_{lim1}$) for shut-off of said means for feeding charging current during rising fluctuating voltage is lower than said second limit value ($U_{lim2}$) for turn-on of said means for feeding charging current (46) during falling fluctuating voltage.

* * * * *